United States Patent
Shaffer et al.

(10) Patent No.: US 6,327,364 B1
(45) Date of Patent: Dec. 4, 2001

(54) REDUCING RESOURCE CONSUMPTION BY ACD SYSTEMS

(75) Inventors: Shmuel Shaffer, Palo Alto; William J. Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/213,090

(22) Filed: Dec. 15, 1998

(51) Int. Cl.[7] .............................. H04M 3/00; H04M 5/00
(52) U.S. Cl. ................ 379/265.02; 379/266.04; 379/219
(58) Field of Search .................. 379/266.01–266.1, 379/265.01–265.14, 309, 207.01–207.16, 219; 370/270, 271

(56) References Cited

U.S. PATENT DOCUMENTS

| | | | |
|---|---|---|---|
| 4,436,962 | | 3/1984 | Davis et al. . |
| 5,006,983 | * | 4/1991 | Wayne et al. ................ 264/401 |
| 5,278,898 | * | 1/1994 | Cambray et al. ............. 379/266 |
| 5,452,350 | * | 9/1995 | Reynolds et al. ............ 379/265 |
| 5,963,635 | * | 10/1999 | Szlam et al. ................. 379/309 |
| 6,046,762 | * | 4/2000 | Sonesh et al. ............... 348/16 |
| 6,049,547 | * | 4/2000 | Fisher et al. ................ 370/412 |
| 6,170,011 | * | 1/2001 | Beck et al. .................. 709/224 |
| 6,175,621 | * | 1/2001 | Begeja ......................... 379/207 |

* cited by examiner

Primary Examiner—Ahmad Matar
Assistant Examiner—Benny Q. Tieu

(57) ABSTRACT

A system and a method for managing incoming calls within a call queue include a network bandwidth monitor for monitoring network bandwidth availability on a call center and a queue call rate monitor for determining a total of all call charge rates associated with the calls. A queue manager determines the order of advancement of the calls within the queue. If the network bandwidth monitor determines that network bandwidth availability is below a predetermined threshold, high network bandwidth calls are preferentially advanced to free up additional network bandwidth. Calls with high charge rates are preferentially advanced if the total call charge rate in the queue exceeds a predetermined maximum threshold. If the maximum total call charge rate threshold is exceeded and the network bandwidth availability level is below the minimum threshold, a relative priority for maintaining network bandwidth availability and reducing total call charge rates will determine the order of call advancement. In a preferred embodiment, a router resource monitor determines whether router resource availability is above a minimum threshold level. Different priority sets are configured for each combination of a low network bandwidth availability state, a low router resource availability state, and/or a high total call charge rate state. Call advancement within the queue is at least partially determined by the priority sets.

19 Claims, 6 Drawing Sheets

REDUCING RESOURCE CONSUMPTION BY ACD SYSTEMS

BACKGROUND OF THE INVENTION

The present invention relates generally to processing calls on a telecommunications network and more specifically to a system and method for handling incoming calls to an Automatic Call Distribution (ACD) systems.

DESCRIPTION OF THE RELATED ART

ACD systems find widespread application in service industries for such purposes as providing automated banking services, airline arrival and departure information, and technical product support. The ACD system enables efficient and cost-effective processing within these services because it is able to solicit user feedback which can be utilized to either automatically access recorded information to be played for the caller or to automatically route the call to an ACD agent who is competent to handle the call.

One concern in designing an ACD system is ensuring that calls are efficiently routed to an ACD agent, so as to minimize the amount of time that any particular call is placed on hold. One basic technique of minimizing on-hold time is to employ a first-in/first-out call handling technique. The first-in/first-out technique requires that calls are routed to the next available ACD agent in the order in which the calls are received. However, in some ACD systems ACD agents are specialized in handling particular types of calls, so the first-in/first-out technique is not appropriate. For example in a product support department of a software facility, ACD agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an ACD agent having specialized knowledge regarding the database program or the spreadsheet program, rather than being routed to an agent with specialized knowledge in the word processing program.

U.S. Pat. No. 5,278,898 to Cambray et al. describes a system for managing ACD calls in which a system operator can configure criteria which are utilized by a queue prioritizer/call retriever to sequentially route calls to ACD agents. The criteria cited as examples include the length of time for which the calls have been on hold and whether a recording has been played for the caller. If the system operator recognizes that callers are more likely to disconnect from the ACD shortly after an occurrence of a particular event, for example transmission of a hold message, it is desirable to connect the caller to an ACD agent as soon as possible after the occurrence of the event. Upon detecting that the hold message has been transmitted over a particular call, the queue prioritizer/call retriever advances the call in an ACD queue to avoid losing the caller. As with many conventional ACD systems, the emphasis in managing the incoming call queue is primarily on avoiding loss of callers due to the callers being placed on hold for excessive intervals. However, the Cambray et al. patent does note that it is known to utilize an identification of a dialed telephone number as an indicator that a call is a long distance call and to handle that call prior to local calls.

Cambray et al. provides an example of an airline reservation system. Calls that are on hold longer than ten minutes are placed in a highest category of priority, since providers define that time period as the limit of acceptability. A middle category of priority may be for calls which have been on hold between one and two minutes, if it has been determined that customers are most likely to hang up during this period. All other calls may be assigned to a lowest category of priority, with the calls in this category being handled on a first-in-first-out basis.

Thus, the focus in the management of calls has been upon maximizing availability to customers, so as to achieve an acceptable profit margin in a competitive environment of customer service. Call management approaches that increase revenue may lead to savings for customers.

What is needed is a call management approach that is adaptable with respect to limitations of a call center, such that limited economic and/or hardware resources can be used efficiently.

SUMMARY OF THE INVENTION

A system and a method for automated handling of calls for a call center include determining system resource requirements for processing each call. The system resource requirements are related to the use of call-handling resources available to the call center. A strategy for advancing the calls to the call center includes utilizing the system resource requirements of the individual calls as one factor and preferentially advancing certain calls relative to other calls. In the preferred embodiment, the strategy includes providing alternative sets of call-advancement priorities. The selection of the set of priorities to be enforced is dependent upon the conditions of the call center. That is, the call-advancement preferences are dynamically set in the preferred embodiment. Other important factors in determining the appropriate set of priorities include customer satisfaction and the cost of maintaining individual calls.

Network bandwidth is one system resource that is monitored. The switching capacity of a network router is another resource of concern. In response to detecting that network bandwidth availability has fallen below a threshold level, a set of call-advancement priorities (i.e., "rules") is selected to preferentially advance calls which are identified as having high network bandwidth requirements. Alternatively, if the network bandwidth availability is above the threshold, but the router resource availability for handling additional calls is below a threshold level, a second set of priorities may be selected to be preferential to advancing calls having high router resource requirements. The relative preferences determine the order of advancement of calls within a call queue.

In a preferred embodiment, the invention is practiced in a voice-over-data network environment. A network bandwidth monitor observes network traffic on a data network, such as a Local Area Network (LAN), to determine the network bandwidth availability. A router resource monitor determines the availability of router resources for handling additional incoming calls. Router resources and network bandwidth are monitored separately in a network configuration, where router resources may be shared with a second network. It is possible in such a configuration that the LAN media will have low traffic (i.e., high availability), while heavy traffic on the second network is consuming most of the shared router resources.

A call charge rate determining mechanism identifies a call charge rate associated with each incoming call. For example, if the system operator utilizes an 800 service through a Local Exchange Carrier (LEC), then each long distance call will incur charges to the system operator as soon as the call is received. The call charge rate determining mechanism can utilize an Automatic Number Identifier (ANI) provided by the LEC to search a table of long distance rates to identify the long distance charge rates for the calls.

A call bandwidth requirements monitor identifies network bandwidth requirements for each incoming call. Network bandwidth requirements for the call can be determined by the compression algorithm utilized for the incoming calls. For example, on a voice-over-data network a G.711 call will occupy substantially more bandwidth than a G.723 call. Another consideration in determining network bandwidth requirements for the incoming calls is ascertaining whether the calls are multimedia calls. A voice-only call will occupy significantly less bandwidth than a video teleconferencing call.

In the preferred embodiment, a queue manager communicates with the call charge rate determining mechanism, the network bandwidth monitor, and the call bandwidth requirements monitor to determine the queue order at least in part based on the network bandwidth availability, call requirements of the incoming calls, and the total call charge rate associated with the incoming calls. The queue manager relies on the relative preferences to determine the order of incoming calls within the queue. The queue manager responds to extreme conditions within the system by configuring the queue order to best alleviate the conditions. For example, if network bandwidth availability is below the minimum level, high bandwidth calls are advanced to the front of the queue in order to free up network bandwidth. The queue manager responds to low router resource availability by expediting the routing of calls with high router resource requirements and, in response to a detected total call charge rate above a predetermined level, the queue manager accelerates advancement of calls with high call charge rates. Furthermore, in the event that the state of the system includes some combination of a sub-threshold bandwidth availability level, a sub-threshold router resource availability level, and a total call charge rate above the predetermined level, a specific set of priorities is selected to dictate the queue order of incoming calls.

DETAILED DESCRIPTION

Figure 1:
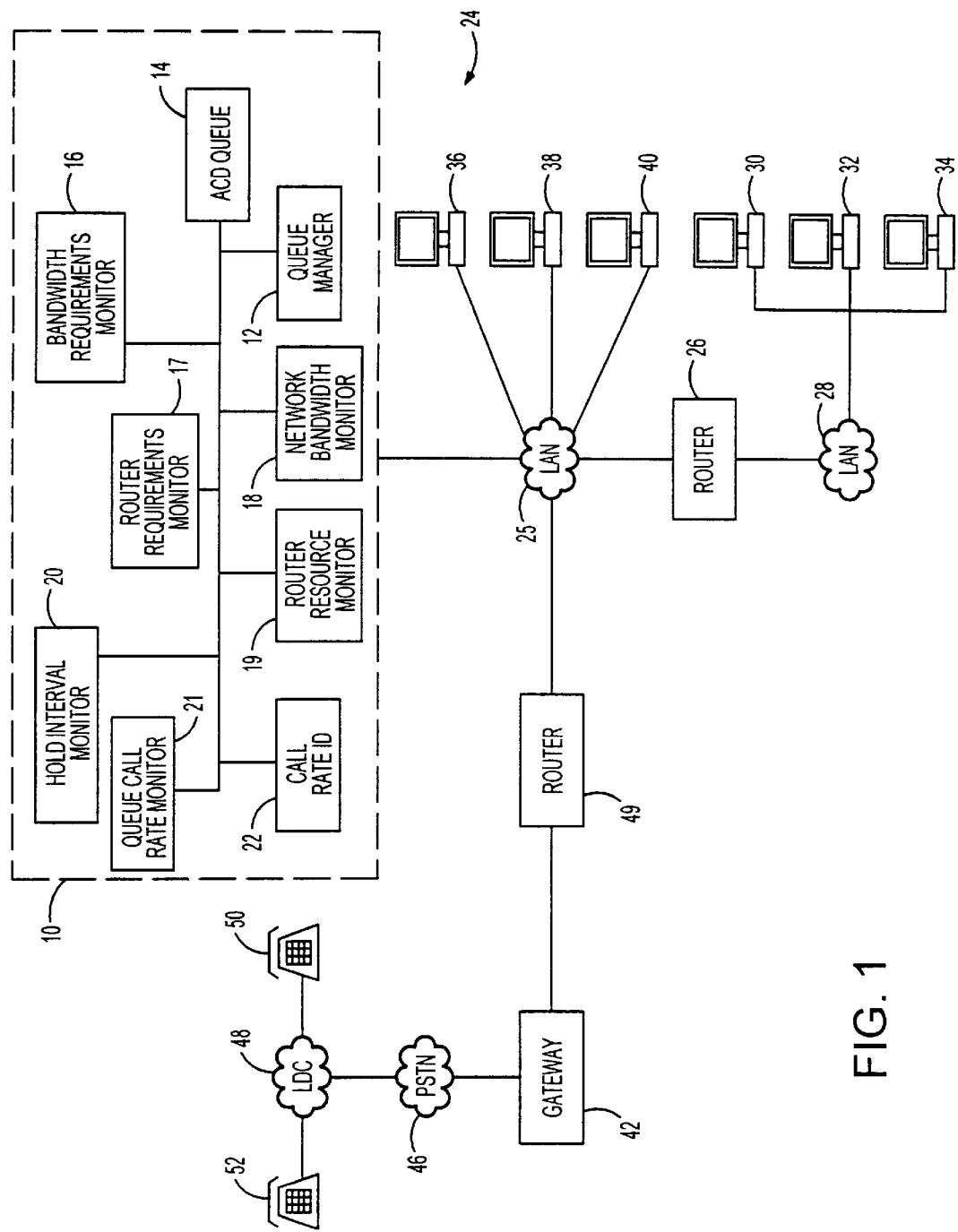
FIG. 1 is a high level block diagram of a system for handling incoming calls to an ACD system according to the present invention.

With reference to FIG. 1, an ACD system 24 is located on a data network which is equipped for voice communications, such as a telephony-enabled Local Area Network (LAN) 25. A router 26 provides routing functions for first 30, second 32, and third 34 telephony-enabled computers on a second LAN 28. Digital phones can be substituted for the telephony-enabled computers for the purposes of this invention. Furthermore, although the system and method will be described in use with an ACD system and a simplified LAN configuration, the invention can be practiced within any type of call center and within more sophisticated LAN configurations of telephony-enabled computers and digital telephones. The telephony-enabled computers 30, 32, and 34 can establish multimedia connections with the ACD agent terminals 36, 38, and 40.

A gateway 42 provides protocol conversion functions to enable communication between the ACD agent terminals 36–40 and remote devices, such as first and second telephones 50 and 52 on a Public Switch Telephone Network (PSTN) 46. An in-line router 49 is used to direct calls. The connection between the first and second telephones and the ACD agent terminals is made through a Long Distance Carrier (LDC) 48. An ACD system operator can utilize an 800 service through the PSTN such that long distance calls to the ACD 24 are charged to the ACD system operator. The 800 service enables the system operator to provide service to callers without the disincentive of long distance charges. For example, if the ACD 24 is operated by a catalog retailer, potential customers would be less inclined to purchase items from the catalog over the phone if, in addition to the costs of the items, the customer had to absorb the long distance charges for the call.

An ACD call management system 10 may be implemented in software within a workstation, similar to the computers 36–40. The system 10 includes a hold interval monitor 20 for monitoring the length of time each incoming ACD call is placed on hold within an ACD call queue 14. A bandwidth requirements monitor 16 determines the bandwidth requirements for each incoming ACD call. The determination can include identifying the compression algorithm associated with each call and determining whether each call is a multimedia call. For example, a call from the first telephone 50 might utilize a G.711 compression algorithm, whereas an internal call from the first computer 30 utilizes a G.723 compression algorithm. Everything else being equal, the call from the first telephone will require significantly more bandwidth than the first computer call. However, if the call from the first telephone is a voice-only call, and the first computer call is a multimedia call with a video teleconferencing feature, the first computer call will have higher bandwidth requirements than the call from the first telephone 50. In addition to monitors 16 and 20, the system 10 includes a router requirements monitor 17 that determines the level of router resources required by each ACD call in the ACD queue 14.

Call charges accumulate when certain types of calls are placed on hold within the ACD queue. For example, an 800 call received from the first telephone 50 will start to accumulate charges to the ACD system operator upon being received. A call rate identifier 22 obtains call rate information for each incoming ACD call. One technique which the call rate identifier can utilize to obtain call rate information is to utilize the Automatic Number Identifier (ANI) for each call received to access a long distance rate table in the call rate identifier.

A network bandwidth monitor 18 determines the network bandwidth available to the ACD 24 to handle additional ACD calls. A router resource monitor 19 determines the level of resources which is available for handling incoming ACD calls. Router resource availability is considered separately from network media bandwidth availability if the in-line router 49 that provides connectivity for computers 36–40 is connected to another LAN of devices. In FIG. 1, the router 26 that provides connectivity for the first 30, second 32, and third 34 computers of LAN 28 is connected to the local LAN 25. Consequently, even if internal traffic on the local LAN is low, network traffic on the remotely located LAN might create a shortage of router resources for the ACD 24.

In a first embodiment, an ACD queue manager 12 configures the order of handling incoming ACD calls based upon either or both of the call charge rates associated with the incoming calls and their network bandwidth requirements. The network bandwidth monitor 18 is configured to detect a minimum threshold of network bandwidth availability for handling ACD calls. The precise value of the threshold, which might be expressed in percent of availability, is configurable and not critical to the invention. The system operator can set the minimum network bandwidth availability threshold to a level which satisfies the operator's requirements. A queue call rate monitor 21 determines the total call charge rate, for instance a long distance charge rate, for all calls in the ACD queue 14 to determine whether the total call charge rate is above a maximum threshold level.

In one embodiment, priorities for advancing different types of ACD calls vary according to network resource availability, such as the bandwidth availability level. In another embodiment, both network resource availability and the total call charge rate level are considered. For example, the network bandwidth monitor 18 determines that network bandwidth availability has fallen below the minimum threshold, but the call charge rate is below the maximum threshold level, the ACD queue manager 12 will accelerate the advancement of high network bandwidth calls in order to free up more network bandwidth according to one priority set. On the other hand, if the queue call rate monitor 21 determines that the total call charge rate is above the maximum threshold level, but the network bandwidth availability level is above the minimum threshold, the ACD queue manager 12 preferentially advances high charge rate calls within the ACD queue according to another priority set in order to reduce costs to the ACD system user. The exact extent to which calls are advanced within the ACD queue can be established by the system user. For example, if reducing long distance charge rates is a high priority, high charge rate calls might be accelerated to the front of the ACD queue during intervals when the total charge rate exceeds the maximum threshold level. Alternatively, high charge rate calls might only be advanced in front of ACD calls which have bandwidth requirements below a predetermined level.

If the network bandwidth availability is below the minimum threshold and the total call charge rate is above the maximum threshold level, the extent to which high network bandwidth calls and/or high charge rate calls will be preferentially advanced within the ACD queue is determined by yet another priority set. Although the discussion to this point has focused on a single threshold for network bandwidth availability and a single maximum threshold level for total call charge rate, it should be understood that multiple thresholds can be utilized to define ranges of network bandwidth availability and total call charge rate. Each combination of a range of network bandwidth availability and a range of total call charge rate will have an associated ACD call advancement priority set which determines the extent to which high bandwidth calls and/or calls with high charge rates will be preferentially advanced within the ACD queue. Use of multiple thresholds enables the system user to fine-tune ACD queue management.

Figure 2:
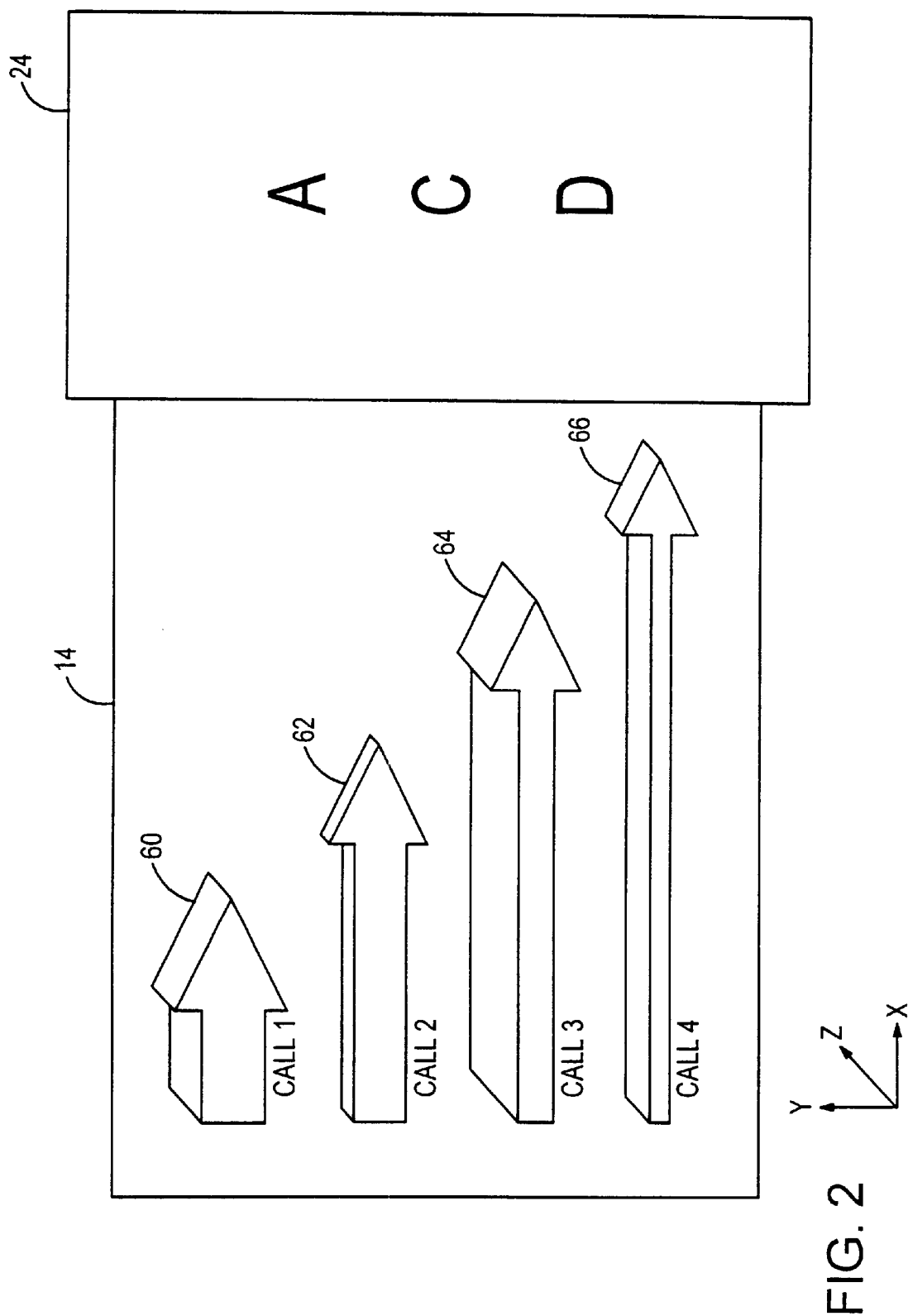
FIG. 2 is a schematic diagram of a queue for incoming ACD calls to the system shown in FIG. 1 during an interval of low network bandwidth availability.

In a preferred embodiment, the ACD queue manager 12 also considers router resource availability in determining the order of calls in the ACD queue 14. The router resource monitor determines whether the router resources available to handle particular calls are below a predetermined threshold. If router resources fall below the predetermined threshold, the ACD queue manager is more likely to accelerate advancement of calls with high router resource requirements. Referring to FIGS. 1 and 2, calls within the ACD queue 14 are depicted as three dimensional arrows wherein the length of each arrow on the x-axis represents the call charge rate associated with each call, the height of each arrow along the y-axis represents the network bandwidth requirements of each call, and the depth of each arrow along the z-axis represents the router resource requirements of each call. In FIG. 2, the network bandwidth availability for the LAN on which the ACD 24 is located is below the minimum threshold, the router resource availability is above the minimum threshold, and the total charge rate for calls within the ACD queue 14 is below the maximum threshold level. The ACD queue manager 12 relies on a fourth set of call advancement priorities to determine that a first call 60 having the highest network bandwidth requirement is advanced to the front of the queue, even though the first call might have been the last received among the first 60, second 62, third 64, and fourth 66 calls. The fourth call is positioned last in the queue 14 even though it has the highest call charge rate because the fourth priority set places a strong emphasis on freeing up network bandwidth. Alternatively, the fourth call might have been advanced to the second or third position if reducing the total call charge costs were more strongly emphasized within the fourth priority set.

Figure 3:
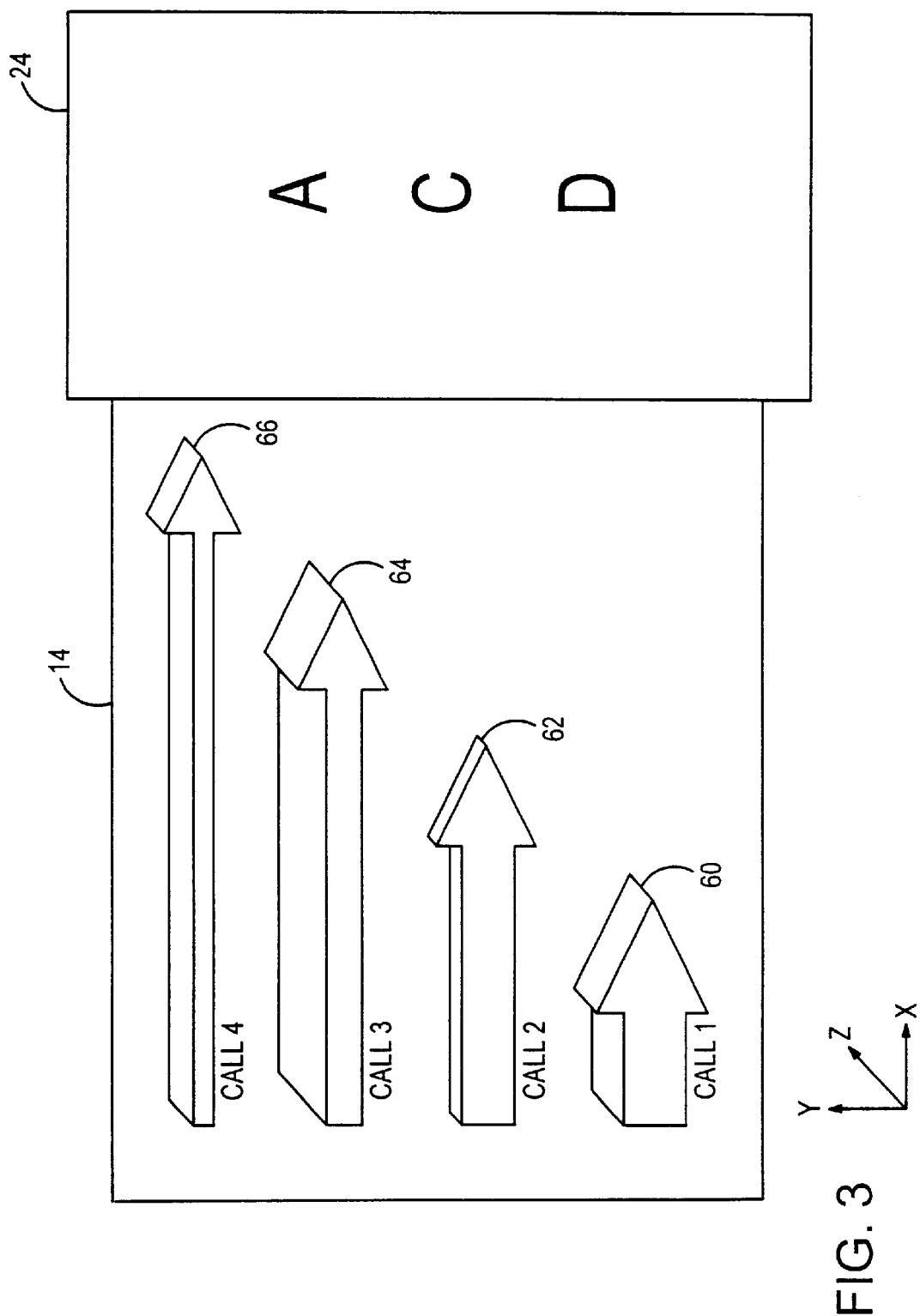
FIG. 3 is a schematic diagram of the queue for incoming ACD calls to the system of FIG. 1 during an interval of a high total of call charge rates for the ACD calls.

Referring to FIGS. 1 and 3, calls within the ACD queue 14 are shown during an interval when the total call charge rate is above the maximum threshold level, the bandwidth availability level is above the minimum threshold, and the router resource availability level is above the minimum threshold. In this case, the sequence of calls within the ACD queue 14 is the reverse of the sequence which is shown in FIG. 2. The priority for accelerating advancement of calls within the ACD queue 14 during intervals of high total call charge rates is to accelerate advancement of calls having high call charge rates. Consequently, the fourth call 66 is preferentially advanced to the front of the ACD queue in order to reduce the amount of time that the fourth call accumulates charges while remaining on hold. Again, high charge rate calls will not necessarily be advanced to the front of the ACD queue 14 even during high total call charge rate intervals. If the hold interval monitor 20 determines that an ACD call has been on hold for longer than a predetermined time interval, the ACD queue manager 12 will prevent the call from being displaced within the ACD queue 14 by a high charge rate call, such as the fourth call 66. Furthermore, the fourth priority set might provide that high charge rate calls only be advanced within the ACD queue in front of calls having router resource requirements below a predetermined level and/or bandwidth requirements below a predetermined level.

Figure 4:
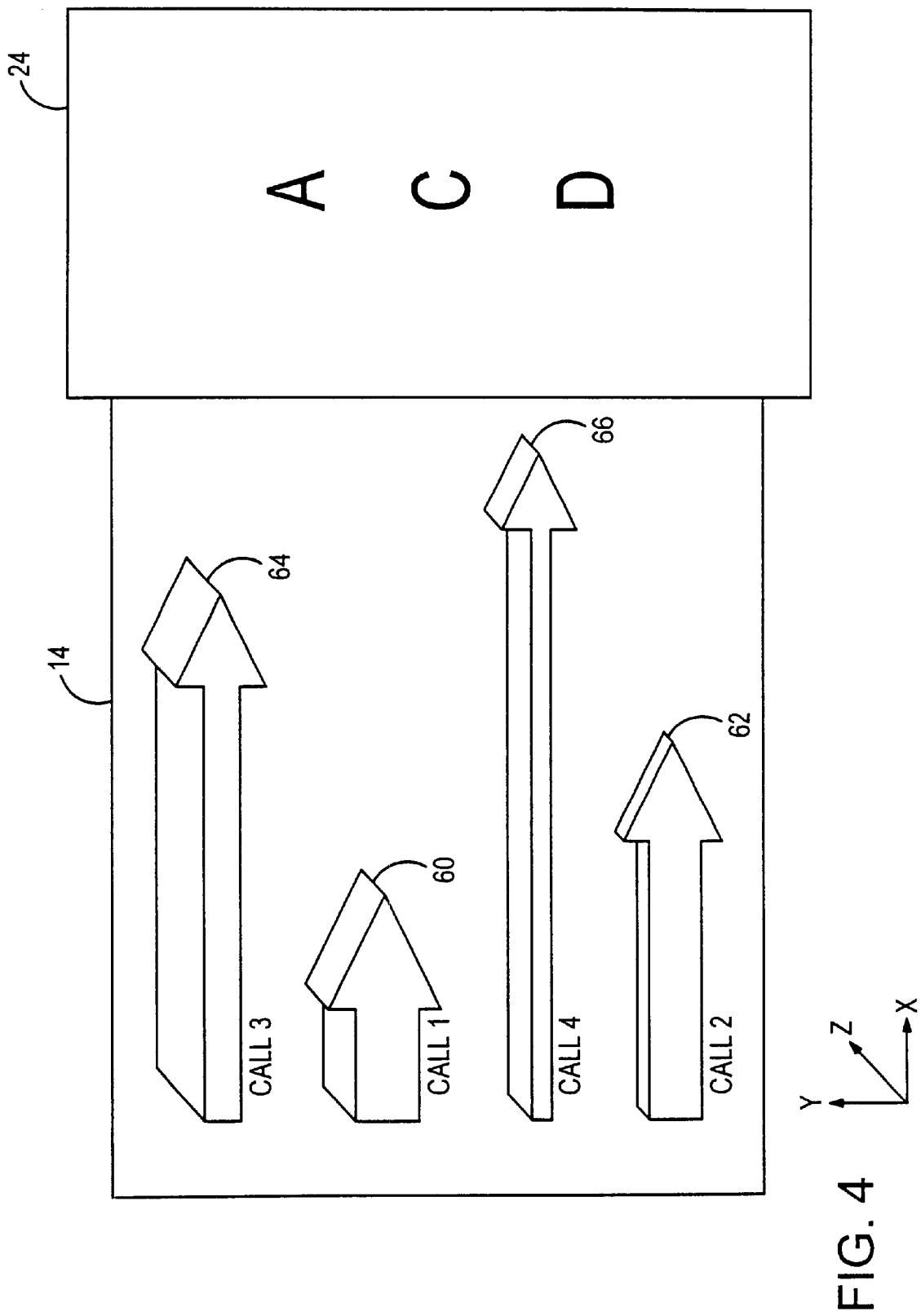
FIG. 4 is a schematic diagram of the ACD queue of FIG. 1 during an interval of low router resource availability.

Referring to FIG. 4, the calls are shown within the ACD queue 14 during an interval in which the router resource availability level is below the minimum threshold. Consequently, calls having high router resource requirements are preferentially advanced within the ACD queue to free up additional router resources. The third call 64, which has the highest router resource requirements, is preferentially advanced within the ACD queue, followed by the first call 60, the fourth call 66, and the second call 62 in order of decreasing router resource requirements.

Figure 5:
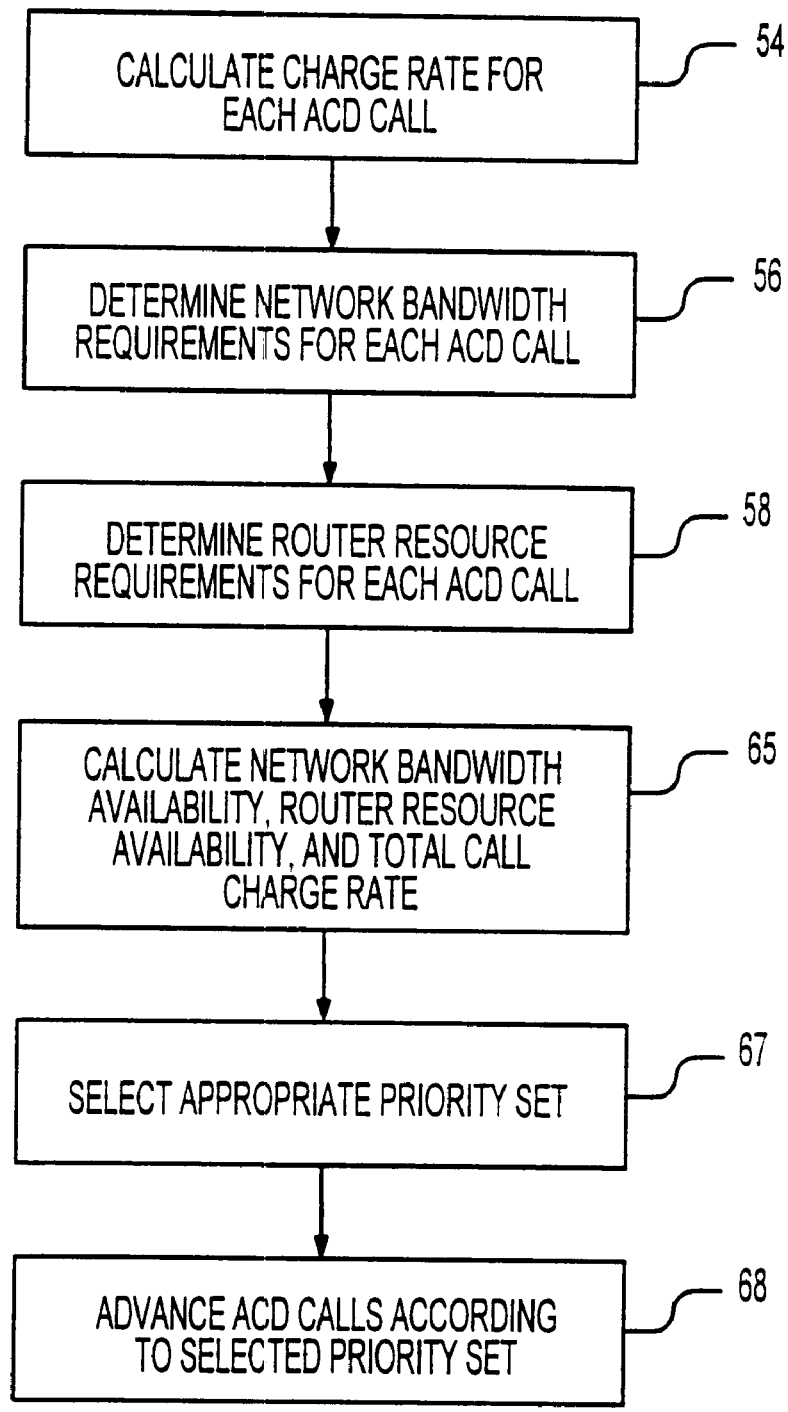
FIG. 5 is a process flow of a method for advancing ACD calls utilizing the system of FIG. 1.

With reference to FIGS. 1 and 5, a method for managing advancement of ACD calls within the ACD queue 14 includes the step 54 of calculating a call charge rate for each incoming ACD call. This step is included only if tariffs are used as one of the factors of the call advancement strategy. In steps 56 and 58, network bandwidth requirements and router resource requirements for each ACD call are determined. In step 65, network bandwidth availability, router resource availability, and the total call charge rate for all calls in the ACD queue are calculated. As will be discussed in greater detail below, each combination of a low network bandwidth availability level, a low router resource availability level, and/or high total call charge rate has an associated priority set which determines the advancement of calls by the ACD queue manager 12. In step 67, the appropriate priority set is selected. This step is dynamic, since the priority set will change according to the circumstances. In step 68, the ACD manager 12 advances calls within the ACD queue 14 according to the presently enforced priority set.

Figure 6:
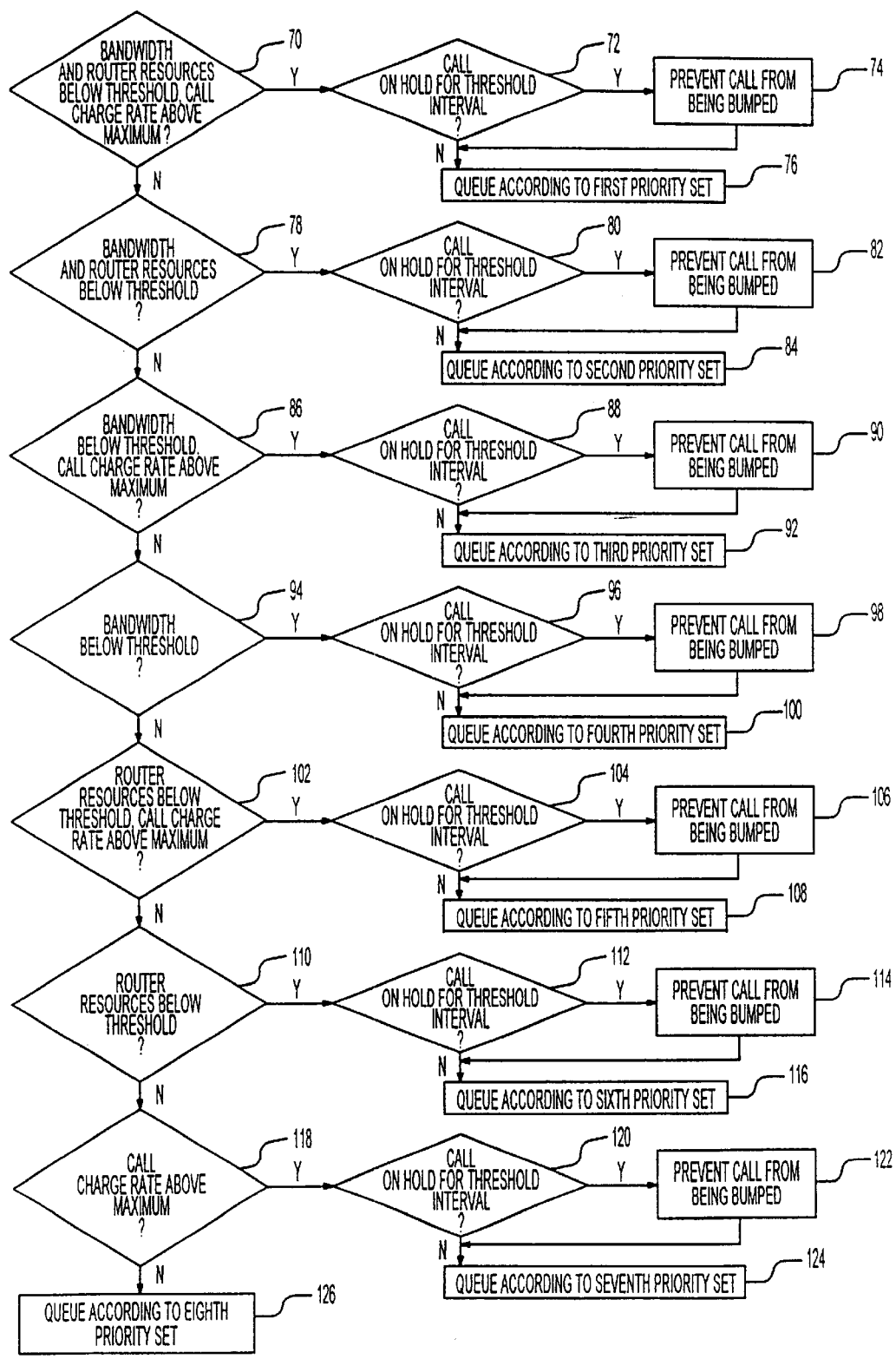
FIG. 6 is a process flow of a method of utilizing the system of FIG. 1 for handling incoming ACD calls.

With reference to FIGS. 1 and 6, a method for processing incoming calls within an ACD queue includes the step 70 of determining whether an available network bandwidth level and an available router resource level for handling additional incoming ACD calls are below their respective minimum thresholds. Decision step 70 also includes determining whether a total call charge rate for ACD calls within the ACD queue 14 is above a predetermined maximum level. The total call charge rate might be a total of long distance rates associated with the ACD calls or any other type of charges which are associated with the calls.

If the network bandwidth availability and the router resource availability levels are below their respective thresholds and the total call charge rate is above the maximum level, a first priority set will determine which of the calls within the ACD queue will be preferentially advanced. For example, if the highest priority for the ACD system operator is to decrease operating costs associated with call charges, the routing of high charge rate calls will be expedited at the expense of most other calls within the ACD queue. The system operator can set the precise parameters of the first set of priorities so that, for example, although high charge rate calls will have the highest priority as a general matter, calls having a particular charge rate will only be advanced in front of calls having network resource requirements below a preselected level and/or bandwidth requirements below a preselected level. In other words, the system operator can calibrate the priority sets to precisely determine ACD queue management policy.

In step 72, the hold interval monitor 20 determines whether a call within the ACD queue 14 has been on hold for longer than the predetermined interval. The predetermined time interval is set by the system operator to avoid losing callers who hang up because of being placed on hold for too long. If one of the calls within the ACD queue has been on hold for the predetermined time interval, in step 74 the ACD manager will prevent that call from being bumped from its position by a preferentially advanced call. For example, if a high charge rate call is the highest priority call within the ACD queue 14 under the first priority set, the ACD queue manager 12 will not advance the high charge rate call in front of the call which has been on hold for longer than the threshold interval. If no call has been on hold for the threshold interval, the high charge rate call is advanced within the ACD queue in accordance with the first priority set in step 76.

In step 78, the network bandwidth monitor 18 and the router resource monitor 19 determine whether the network bandwidth and the router resource availability levels are below their respective thresholds. A second priority set which determines call advancement priority for low bandwidth/low router resource intervals on the ACD-supporting network generally requires preferential advancement of calls with high network bandwidth and router resource requirements at the expense of calls with high charge rates. High charge rate calls are not preferentially advanced during this interval because the total call charge rate is below the maximum level. Again, the hold interval monitor determines whether any call has been on hold for longer than the threshold interval in step 80 and the ACD queue manager 12 prevents any such calls from being bumped in step 82. If no calls have been on hold for longer than the threshold interval, the calls are advanced according to the second priority set in step 84.

In step 86, the network bandwidth monitor 18 and the queue call rate monitor 21 determine whether the network bandwidth level is below the minimum threshold and the total call charge rate for the calls within the ACD queue 14 is above the maximum level. If there is an affirmative response, in step 88 the hold interval monitor 20 determines whether a call within the ACD queue has been on hold for longer than the threshold interval and, if so, in step 90 the queue manager 12 prevents that call from being displaced by a call preferentially advanced call under a third priority set. If no call has been on hold for at least the threshold interval, in step 92 the ACD queue manager 12 advances the calls within the ACD queue 14 according to the third priority set. The third priority set accelerates advancement of calls having high bandwidth and/or high charge rates in order to free up network bandwidth and/or reduce call charges. Again, the precise extent to which high network bandwidth calls and high charge rate calls are advanced within the ACD queue 14 with respect to other calls is determined by the configuration of the third priority set by the system operator.

In step 94, the network bandwidth monitor 18 determines whether the network bandwidth level is below the minimum threshold. A fourth priority set determines the extent to which high network bandwidth calls are accelerated within the ACD queue 14 during low bandwidth availability intervals. Because the total call charge rate is below the maximum level and the router resource availability is above the minimum threshold, the priority is to advance high bandwidth calls in the ACD queue and route them to the next available ACD agent to free up additional network bandwidth. Step 96 is another call hold interval threshold decision step. If a call has been on hold for the threshold interval, in step 98 the ACD queue manager 12 prevents that call from being bumped out of its position in the ACD queue. After step 98, or if the result of decision step 96 is negative, the high bandwidth calls are advanced within the queue according to the fourth priority set in step 100.

In step 102, the router resource monitor 19 and the queue call rate monitor 21 determine whether router resources are below the minimum threshold and the total call charge rate is above the maximum threshold. If the result from decision step 102 is positive, decision step 104 follows in which it is determined whether a call in the ACD queue 14 has been on hold for longer than the minimum threshold time interval. If the result of decision step 104 is positive, the queue manager 12 prevents the call from being displaced by a preferentially advanced call with a high charge rate and/or high router resource requirements in step 106. The high charge rate calls and/or calls with high router resources are advanced within the ACD queue 14 according to the fifth priority set in step 108.

The router resource monitor 19 determines whether router resources are below the minimum threshold in step 110. If router resources are below the minimum threshold, decision step 112 determines whether any ACD calls have been on hold for the predetermined threshold before accelerating advancement of ACD calls having high router resource requirements according to a sixth priority set in step 116. If a call has been on hold for longer than the threshold interval, in step 114 that call is prevented from being displaced by a preferentially advanced ACD call.

The queue call rate monitor 21 determines whether the total call charge rate of calls in the ACD queue 14 is above the maximum level in step 118. If the maximum total call charge rate is exceeded, in step 120 the call monitor determines whether a call in the ACD queue has been on hold for the threshold terminal interval. If the threshold interval is exceeded for a call, in step 122 the ACD queue manager 12 prevents the preferentially advanced high charge rate calls from displacing the call from its position in the ACD queue. In step 124, the high call charge rate calls are advanced according to a seventh call advancement priority set. If the total call charge rate is below the maximum threshold level, and the network bandwidth and router resource availability levels are above their respective minimum threshold levels, in step 126 calls in the ACD queue 14 are advanced according to an eighth priority set. The eighth priority set provides a default set of priorities which dictates ACD call management policy in the absence of network resource scarcity or a high total call charge rate.

While FIGS. 2–6 have been used to describe an embodiment in which bandwidth, router resources, and call charges are interrelated factors in executing a particular call-advancement strategy, other embodiments are contemplated. The consideration of call charges is not critical. Moreover, other indications of system resource availability may be used in place of either or both of network bandwidth availability and router resource availability. The preferred factors are dependent on the application and the desired balance between customer needs and call center practicalities.

What is claimed is:

1. A method of systematically advancing calls for a call center comprising steps of:
   determining system resource requirements for processing each call of said call center, said system resource requirements being related to use of call-handling equipment resources available to said call center;
   monitoring a current level of said call-handling equipment resources currently unavailable for receiving incoming calls to said call center; and
   executing a predefined strategy for advancing said calls through said call center, including utilizing said determinations of system resource requirements of said calls and said monitoring of said current level as factors in implementation of said predefined strategy, including selecting call-advancement priorities to preferentially advance calls having relatively high system resource requirements whenever said current level is above a preselected level.

2. The method of claim 1 wherein:
   said step of monitoring includes identifying a level of availability of system bandwidth for processing said calls of said call center; and
   said step of executing said predefined strategy includes selecting a first set of said call-advancement priorities at least partially in response to detecting a condition in which current available system bandwidth is below a threshold level, said first set being preferential to advancing calls having high bandwidth requirements, said predefined strategy having a plurality of alternative sets of call-advancement priorities for determining an order of processing said calls.

3. The method of claim 2 wherein:
   said step of monitoring includes identifying a level of availability of resources of a router of said call center; and
   said step of executing includes selecting a second set of call-advancement priorities partially based on a current level of available router resources, said second set being preferential to advancing calls having high router resource requirements.

4. The method of claim 1 further comprising a step of calculating a call charge rate for each said call, said call charge rate for each said call being a time-based tariff for maintaining connectivity for said each call, wherein said step of executing said predefined strategy includes utilizing said calculated call charge rates as a factor in said strategy, said strategy having a plurality of sets of said call-advancement priorities for determining an order of processing said calls.

5. The method of claim 4 wherein said step of executing said strategy includes selecting and implementing a first set of call-advancement priorities upon detecting that current system resource requirements of said calls reduce said call-handling equipment resources below a preset availability threshold, said first set establishing a preferential advancement policy for calls having higher system resource requirements.

6. The method of claim 5 wherein said step of executing said strategy includes selecting and implementing a second set of call-advancement priorities based upon detecting that a current total of said calculated call charge rates of said calls exceeds a preset charge threshold, said second set establishing a preferential advancement policy for calls having higher calculated call charge rates.

7. The method of claim 1 further comprising steps of receiving said calls and placing said calls in a queue, said step of executing said predefined strategy including setting a call-advancement policy for advancing said calls in said queue.

8. The method of claim 7 wherein said step of receiving said calls includes receiving incoming calls at an Automatic Call Distribution (ACD) system, wherein said step of executing said predefined strategy includes assigning a priority to each said call in said queue, each priority being at least partially based on system resource requirements of said each call.

9. A method for managing incoming calls received at a call center comprising the steps of:
   determining network bandwidth requirements for each of said incoming calls, said network bandwidth requirements being specific to requirements for telecommunication equipment;
   identifying a current level of network bandwidth availability for a network on which said call center is located, including basing identifications upon collective network bandwidth requirements for said incoming calls to said call center;
   in response to detecting a condition of low network bandwidth availability, identifying a first set of a plurality of sets of priorities, said first set being preferential to advancing said incoming calls which are determined as having high network bandwidth requirements; and routing said incoming calls according to said first set of priorities.

10. The method of claim 9 further comprising the steps of:

determining router equipment requirements for each said incoming call;

identifying a current level of equipment resource availability for handling said incoming calls, said router equipment availability being specific to a router of said network;

in response to detecting a condition of low current router equipment availability, identifying a second set of priorities that is preferential to advancing said incoming calls which are determined to have a high router equipment requirement; and routing said incoming calls according to said second set of priorities.

11. The method of claim 9 further comprising the steps of:

calculating a call charge rate for each said incoming call;

in response to detecting a total charge rate for incoming calls within a call queue which is above a predetermined level, identifying a third set of priorities preferential to advancing said incoming calls which are determined to have high call charge rates; and advancing said incoming calls within said queue according to said third set of priorities.

12. The method of claim 9 wherein said step of determining said network bandwidth requirements for said incoming calls includes determining compression algorithms utilized for said incoming calls.

13. The method of claim 9 wherein said step of determining said network bandwidth requirements for said incoming calls includes determining which of said incoming calls are multimedia calls.

14. The method of claim 9 wherein said step of determining network band-width requirements is a step of determining network bandwidth requirements of incoming voice-over-data-network calls.

15. A system for handling incoming calls to a call center comprising:

means for identifying call-specific system equipment requirements for maintaining each said incoming call by said call center;

means for monitoring current availability of system equipment of said call center with respect to maintaining said incoming calls; and means, responsive to said monitoring means, for advancing said incoming calls through said call center with a preference toward advancing incoming calls having high system equipment requirements when said monitoring means detects a condition in which said current availability is below a predetermined threshold level of availability.

16. The system of claim 15 wherein said advancing means is responsive to a determination of low bandwidth availability to accelerate advancement within a call queue of said incoming calls having high network bandwidth requirements.

17. The system of claim 16 further comprising:

means for calculating a level of router resources available to route said incoming calls, said router resources including an equipment router;

means for identifying router resource requirements for each of said incoming calls; and means, in communication with said advancing means, for assigning preferences for maintaining at least a threshold level of network bandwidth availability and at least a threshold level of router resource availability, said advancing means being responsive to said assigned preferences to accelerate advancement of particular ones of said incoming calls in a call queue in response to at least one of a detected low level of network bandwidth availability and a detected low level of router resource availability.

18. The system of claim 17 wherein said advancing means is further configured to accelerate the advancement of said incoming calls having high call charge rates in the absence of said detection of said low level of router resource availability and said low level of network bandwidth availability.

19. The system of claim 15 wherein said means for identifying said call-specific system equipment requirements of said incoming calls is configured to identify compression algorithms associated with each said incoming call and to identify incoming multimedia calls.

\* \* \* \* \*